US012791305B2

(12) United States Patent
Mori et al.

(10) Patent No.: US 12,791,305 B2
(45) Date of Patent: Nov. 10, 2026

(54) MEASUREMENT METHOD OF SURFACE SHAPE AND SURFACE SHAPE MEASUREMENT DEVICE

(71) Applicant: MITUTOYO CORPORATION, Kanagawa (JP)

(72) Inventors: Yumiko Mori, Kanagawa (JP); Yoshiaki Kato, Saitama (JP)

(73) Assignee: MITUTOYO CORPORATION, Kanagawa (JP)

( * ) Notice: Subject to any disclaimer, the term of this patent is extended or adjusted under 35 U.S.C. 154(b) by 612 days.

(21) Appl. No.: 18/120,581

(22) Filed: Mar. 13, 2023

(65) Prior Publication Data

US 2023/0304790 A1 Sep. 28, 2023

(30) Foreign Application Priority Data

Mar. 22, 2022 (JP) ................................ 2022-046101

(51) Int. Cl.
*G01B 11/24* (2006.01)
*G01B 9/0209* (2022.01)
(Continued)

(52) U.S. Cl.
CPC ........ *G01B 11/2441* (2013.01); *G01B 9/0209* (2013.01); *G01B 11/25* (2013.01); *G06T 7/521* (2017.01); *G06T 7/55* (2017.01)

(58) Field of Classification Search
CPC .... G01B 11/24; G01B 11/25; G01B 9/02083; G01B 11/2441; G01B 11/303; G01B 9/02091; G01B 11/005; G01B 11/02; G01B 11/22; G01B 9/0209; G01B 11/30; G01B 9/02004; G01B 9/0203; G01B 9/02032;
(Continued)

(56) References Cited

U.S. PATENT DOCUMENTS

| | | | |
|---|---|---|---|
| 2011/0122420 A1 | 5/2011 | Jansen et al. | |
| 2011/0222069 A1 | 9/2011 | Nagahama et al. | |
| 2017/0330340 A1 | 11/2017 | Watanabe et al. | |

FOREIGN PATENT DOCUMENTS

| | | | |
|---|---|---|---|
| CN | 108369331 B * | 9/2020 | ........... G02B 21/365 |
| EP | 3709258 A2 * | 9/2020 | ............. G06T 7/571 |

(Continued)

*Primary Examiner* — Michael P Stafira
(74) *Attorney, Agent, or Firm* — Greenblum & Bernstein, P.L.C.

(57) ABSTRACT

A measurement method of a surface shape includes combining N stacked images captured while scanning the measuring head. For a position in the N stacked images, from an integral curve including values of N points, which is obtained by integrating square values or absolute values of the interference signal including values at N points: a start-point-side noise part straight line that approximates a start-point-side noise part, which corresponds to a range where the slope is smaller than the slope in the vicinity of the measurement target surface at the start-point-side than the measurement target surface; an end-point-side noise part straight line that approximates an end-point-side noise part, which corresponds to a range where the slope is smaller than the slope in the vicinity of the measurement target surface at the end-point-side than the measurement target surface; and a surface proximity straight line that approximates surface proximity part.

11 Claims, 7 Drawing Sheets

(51) Int. Cl.
*G01B 11/25* (2006.01)
*G06T 7/521* (2017.01)
*G06T 7/55* (2017.01)

(58) Field of Classification Search
CPC ............ G01B 9/02043; G01B 9/02044; G01B 9/02072; G01B 9/02077; G01B 9/02085; G01B 9/02097; G01B 11/007; G01B 11/0608; G01B 11/272; G01B 2210/54; G01B 9/02063; G01B 11/00; G01B 11/002; G01B 11/022; G01B 11/245; G01B 11/2513; G01B 11/285; G01B 7/16; G01B 7/18; G01B 7/20; G06T 19/006; G06T 5/50; G06T 5/70; G06T 7/73; G06T 19/20; G06T 7/50; G06T 5/73; G06T 15/00; G06T 17/10; G06T 2207/10021; G06T 15/10; G06T 2207/30201; G06T 19/003; G06T 13/40; G06T 15/506; G06T 2213/08; G06T 2207/20084; G06T 2207/10056; G06T 2207/20081; G06T 17/00; G06T 7/0012; G06T 7/11; G06T 7/70; G06T 2207/30024; G06T 7/571; G06T 2207/10016; G06T 2207/20221; G06T 7/20; G06T 2207/10081; G06T 15/08; G06T 2207/10012; G06T 2207/10004; G06T 3/4053; G06T 7/30; G06T 2207/10024; G06T 2207/10148; G06T 2207/20076; G06T 7/38; G06T 2200/04; G06T 2200/24; G06T 5/10; G06T 2219/2004; G06T 7/0002; G06T 7/194; G06T 2207/10028; G06T 2207/30168; G06T 3/4015; G06T 3/4038; G06T 17/20; G06T 19/00; G06T 2207/20056; G06T 2207/30044; G06T 2210/41; G06T 11/60; G06T 2207/20208; G06T 5/90; G06T 7/0016; G06T 7/269; G06T 7/292; G06T 7/55; G06T 2207/10064; G06T 2207/20021; G06T 2207/20224; G06T 5/60; G06T 7/521; G06T 2200/32; G06T 2207/10088; G06T 2207/30028; G06T 2207/30101; G06T 2207/30164; G06T 2207/30244; G06T 7/246; G06T 15/60; G06T 17/05; G06T 2207/10072; G06T 2207/20212; G06T 2207/30196; G06T 2219/008; G06T 7/0014; G06T 7/593; G06T 15/04; G06T 2207/10101; G06T 5/20; G06T 7/136; G06T 7/33; G06T 2207/10048; G06T 2207/20044; G06T 2207/30036; G06T 2207/30242; G06T 2215/12; G06T 2219/2012; G06T 3/147; G06T 7/00; G06T 7/0004; G06T 7/001; G06T 7/174; G06T 7/557; G06T 7/80; G06T 12/20; G06T 15/205; G06T 2207/20064; G06T 2207/30041; G06T 2207/30072; G06T 2207/30084; G06T 2207/30172; G06T 2210/62; G06T 2219/028; G06T 3/4007; G06T 7/12; G06T 7/536; G06T 11/00; G06T 15/005; G06T 15/50; G06T 17/205; G06T 2207/10032; G06T 2207/10152; G06T 2207/20012; G06T 2207/20096; G06T 2207/20116; G06T 2207/20216; G06T 2207/30004; G06T 2207/30116; G06T 2207/30144; G06T 2207/30204; G06T 2207/30252; G06T 2215/16; G06T 2219/2016; G06T 3/06; G06T 7/149; G06T 7/248; G06T 7/60; G06T 7/62; G06T 7/64; G06T 7/75; G06T 12/30; G06T 15/503; G06T 2200/08; G06T 2207/20088; G06T 2207/20092; G06T 2207/20152; G06T 2219/2008; G06T 2219/2021; G06T 5/00; G06T 5/77; G06T 7/13; G06T 7/254; G06T 7/596; G06T 7/68; G06T 7/74; G06T 7/90; G06T 7/97; G06T 1/0014; G06T 12/00; G06T 15/06; G06T 15/20; G06T 2207/10116; G06T 2207/20101; G06T 2207/20161; G06T 2207/30008; G06T 2207/30012; G06T 2207/30016; G06T 2207/30032; G06T 2207/30064; G06T 2207/30068; G06T 2207/30141; G06T 2207/30181; G06T 2207/30208; G06T 3/40; G06T 3/4076; G06T 5/30; G06T 7/10; G06T 7/181; G06T 7/207; G06T 7/32; G06T 7/337; G06T 7/507; G06T 7/564; G06T 7/586; G06T 1/20; G06T 11/20; G06T 11/40; G06T 12/10; G06T 2207/10052; G06T 2207/10061; G06T 2207/10121; G06T 2207/20016; G06T 2207/20032; G06T 2207/20164; G06T 2207/20182; G06T 2207/20201; G06T 2207/30061; G06T 2207/30096; G06T 2207/30124; G06T 2207/30132; G06T 2207/30136; G06T 2207/30241; G06T 2210/56; G06T 2211/428; G06T 3/4046; G06T 5/80; G06T 7/155; G06T 7/344; G06T 7/41

See application file for complete search history.

(56) References Cited

FOREIGN PATENT DOCUMENTS

| | | | | | |
|---|---|---|---|---|---|
| JP | 2011-191118 | A | | 9/2011 | |
| JP | 5592763 | B2 | | 9/2014 | |
| JP | 2018115988 | A | * | 7/2018 | |
| JP | 2020096866 | A | * | 6/2020 | ......... G01B 9/02085 |
| JP | 6976712 | B2 | | 12/2021 | |

* cited by examiner

MEASUREMENT METHOD OF SURFACE SHAPE AND SURFACE SHAPE MEASUREMENT DEVICE

CROSS-REFERENCE TO RELATED APPLICATION

This non-provisional application claims priority under 35 U.S.C. § 119(a) from Japanese Patent Application No. 2022-046101, filed on Mar. 22, 2022, the entire contents of which are incorporated herein by reference.

TECHNICAL FIELD

The present invention relates to a measurement method for measuring the surface shape of a measurement target by combining a plurality of stacked images captured while scanning a measuring head in the optical axis direction.

BACKGROUND ART

A surface shape measurement device that precisely measure surface shapes of measurement targets, using a plurality of stacked images captured while scanning a measuring head in the optical axis direction, are conventionally known.

Such surface shape measurement devices, for example, irradiate white light from a light source onto the measurement target and use the luminance information of interference fringes produced by the interference of the light. In this surface shape measurement device, the luminance of the interference fringes combined by way of peaks of the interference fringes of the respective wavelengths being overlapped with each other becomes high at a focus point where the light path lengths of the reference light path and the measurement light path coincide. Therefore, the surface shape measurement device can measure a surface shape of a measurement target by: capturing an interference fringe image, which shows a two-dimensional distribution of the interference light intensity, by means of an imaging element, such as a CCD camera, while changing the light path lengths of the reference light path or the measurement light path; and detecting a focus point where the intensity of the interference light peaks at each measurement position in the capturing field of view so as to measure the height of the measuring surface (i.e., the surface of the measurement target) at each measurement position (see, for example, Patent Document 1).

In addition to those that use the luminance information of interference fringes, there are also those that obtain the focal point (height) from the change in contrast at each pixel position (see, for example, Patent Document 2), those that project a periodic pattern onto the object to be measured and obtain the position where the contrast of the stripe pattern is maximum (see, for example, Patent Document 3), and others.

PRIOR ART DOCUMENTS

Patent Document

Patent Document 1: JP 2011-191118A
Patent Document 2: JP 6976712B
Patent Document 3: JP 5592763B

SUMMARY OF THE INVENTION

Problem to be Solved by the Invention

In the above-described surface shape measurement device that uses the luminance information of interference fringes produced by the interference of the light, the change in luminance of interference light occurs with a period of about the wavelength of light that generates interference. Therefore, capturing of the interference fringe image needs to be repeated while changing the light path length of the reference light path or the measurement light path at intervals sufficiently smaller than the wavelength. The surface shape measurement device then analyzes hundreds to thousands of accumulated interference fringe images to identify the height of the measuring surface at each pixel position. This analysis includes rough peak detection processing in which the height at which the intensity of the interference light is at a maximum is roughly detected, and fine peak detection processing in which the detailed height is determined.

In the rough peak detection processing, for a position of each pixel constituting the interference fringe image, a peak search is performed after applying processing for determining the signal waveform that indicates the change in luminance value relative to the position in the height direction, and after applying signal processing, such as the square, integration, and smoothing differential, to the signal waveform, so as to determine the height at which the intensity of the interference light is at a maximum. In the fine peak detection processing, the detailed height of the measuring surface is determined by focusing on the phase of the signal waveform at the position of each pixel constituting the interference fringe image.

In this way, with the conventional surface shape measurement devices, a large amount of time is required for a single surface shape measurement because the analysis processing is further performed on all the obtained images after a large number of interference fringe images are captured. In addition, the transversal analysis processing performed on a large number of accumulated images requires a large amount of work memory and high computational power.

Surface shape measurement devices that use a focal point detection method, in which the focal point (height) is obtained from the change in contrast at each pixel position, and surface shape measurement devices that project a periodic pattern onto the measurement target to determine the position of maximum contrast of the stripe pattern, also require similar analysis processing to obtain the surface shape of the measurement target by combining a plurality of images captured while scanning the measuring head along the optical axis direction, which presents similar problems.

Accordingly, an object of the present invention is to provide a measurement method of a surface shape and a surface shape measurement device that can solve the above-described problem, suppress the work memory and computational power necessary for analysis processing, and thereby reduce the measurement time.

Means for Solving the Problem

To solve the above problem, in the measurement method of the surface shape according to the present invention, surface shape of the measurement target is measured by combining N stacked images captured while scanning the measuring head in the optical axis direction. In the measurement method, for a common position in the N stacked images, from an integral curve consisting of values of N points, which is obtained by integrating the height-dependent signal consisting of values at N points indicating changes in the pixel value along the axis direction, a start-point-side noise part straight line that approximates a start-point-side noise part, which corresponds to a range where the slope is smaller than the slope in the vicinity of the measurement target surface at the start-point-side than the measurement target surface, an end-point-side noise part straight line that approximates a end-point-side noise part, which corresponds to a range where the slope is smaller than the slope in the vicinity of the measurement target surface at the end-point-side than the measurement target surface, and a surface proximity straight line that approximates surface proximity part, which corresponds to the vicinity of the measurement target surface; are determined. Then, the position in the Z-axis direction of the measurement target surface is determined based on the start-point-side noise part straight line, the end-point-side noise part straight line, and the surface proximity straight line.

In the present invention, the measuring head may be an interferometer optical head that divides, by a beam splitter, light applied from a light source that applies incoherent light into reference light to a reference mirror and measurement light to the measurement target surface, and acquires interference fringe images generated by a light path difference between light reflected from the reference mirror and light reflected from the measurement target surface. In this case, the stacked image may be N (but N≥2) interference fringe images obtained while scanning the interferometer optical head against the measurement target surface from the start point to the end point in the Z-axis direction along the optical axis of the interferometer optical head, and the height-dependent signal may be the square or absolute value of the interference signal consisting of values at N points indicating changes in the interference light intensity along the Z-axis direction.

Alternatively, in the present invention, the measuring head may be an image optical head that captures a two-dimensional image of the measurement target. In this case, the stacked image may be N (but N≥2) two-dimensional images obtained while scanning the image optical head against the measurement target surface from the start point to the end point in the Z-axis direction along the optical axis of the image optical head, and the height-dependent signal may be a contrast curve consisting of values at N points indicating changes in the contrast along the Z-axis direction.

Alternatively, in the present invention, a pattern projection unit may be further provided to irradiate a projection light of a pattern having a predetermined periodicity onto the measurement target surface. The measuring head may be an image optical head that captures a two-dimensional image of the measurement target. In this case, the stacked image may be N (but N≥2) two-dimensional images obtained while scanning the image optical head against the measurement target surface from the start point to the end point in the Z-axis direction along the optical axis of the image optical head, with the pattern projection unit irradiating the measurement target surface with the projection light, and the height-dependent signal may be the square or absolute value of the value of the N points that indicates the change along the Z-axis direction of the intensity of the reflected light, which is the projection light reflected by the measurement target surface.

In the present invention, the surface proximity straight line may be a straight line with the maximum slope out of approximate straight lines for a predetermined number of consecutive points in the integral curve. For example, the approximate straight lines may be determined by applying the least squares method to all of the predetermined number of points. Alternatively, the straight line connecting the points at the ends of the predetermined number of consecutive points may be set as the approximate straight line.

In the present invention, the start-point-side noise part straight line and the end-point-side noise part straight line may be determined under the restriction that the slopes of the start-point-side noise part straight line and the end-point-side noise part straight line are equal.

In the present invention, the start-point-side noise part straight line may be determined based on a predetermined number of points from the start point in the integral curve, and the end-point-side noise part straight line may be determined based on a predetermined number of points from the end point in the integral curve.

In the present invention, the intersection of an intermediate straight line and the surface proximity straight line may be the position in the Z axis direction of the measurement target surface. The intermediate straight line is a line having a slope obtained by averaging the slope of the start-point-side noise part straight line and the slope of the end-point-side noise part straight line, and having an intercept obtained by averaging the intercept of the start-point-side noise part straight line and the intercept of the end-point-side noise part straight line.

In the present invention, after acquiring the first stacked image, analysis processing may be performed on the stacked images up to the M−1-th image while sequentially acquiring the M-th (where 2≤M≤N) stacked images. The analysis processing may include, for a each position in the lastly acquired k-th stacked image, at least: integral curve update processing for determining the values of the points from the start point to the k-th point constituting the integral curve; latest approximate straight line calculation processing for determining the approximate straight line for a predetermined number of consecutive points including the k-th point of the integral curve as the point closest to the end point; and tentative surface proximity straight line update processing for determining the tentative surface proximity straight line with the maximum slope out of approximate straight lines for the predetermined number of consecutive points up to the k-th point in the integral curve. In the tentative surface proximity straight line update processing, the tentative surface proximity straight line determined for the points up to the k−1-th point in the integral curve may be compared with the approximate straight line determined in the latest approximate straight line calculation processing, and the one with the greater slope may be determined as the new tentative surface proximity straight line, The tentative surface proximity straight line obtained by the tentative surface proximity straight line update processing in the analysis process after the N-th stacked image is acquired may be determined as the surface proximity straight line.

In addition, the surface shape measurement device pertaining to the present invention measures the surface shape of a measurement target surface of a measurement target. Such surface shape measurement device comprises: an interferometer optical head that divides, by a beam splitter, light applied from a light source that applies incoherent light into reference light to a reference mirror and measurement light to the measurement target surface, and acquires, by an imaging element, an interference fringe image generated by a light path difference between light reflected from the reference mirror and light reflected from the measurement target surface, and an analysis unit that determines the surface shape of the measurement target surface based on the interference fringe image acquired by the interferometer optical head. The interferometer optical head acquires N (where N≥2) interference fringe images while scanning, with respect to the measurement target surface, from a start point to an end point in the Z-axis direction along a light axis of the interferometer optical head. For a common position in the N interference fringe images acquired by the interferometer optical head, the analysis unit determines, from an integral curve consisting of values of N points, which is obtained by integrating square values or absolute values of the interference signal consisting of values at N points indicating changes in the interference light intensity along the Z-axis direction: a start-point-side noise part straight line that approximates a start-point-side noise part, which corresponds to a range without the occurrence of interference closer to the start point than to the measurement target surface; an end-point-side noise part straight line that approximates an end-point-side noise part, which corresponds to a range without the occurrence of interference closer to the end point than to the measurement target surface; and an interference part straight line that approximates an interference part, which corresponds to a range with the occurrence of interference in the vicinity of the measurement target surface. Then, the position in the Z-axis direction of the measurement target surface is determined based on the start-point-side noise part straight line, the end-point-side noise part straight line, and the surface proximity straight line.

EMBODIMENTS OF THE INVENTION

First Embodiment

A surface shape measurement device 1, which is a first embodiment of the surface shape measurement device 1 according to the present invention, will be described with reference to the drawings. The surface shape measurement device 1 is obtained by combining an interference optical system and an image measurement device.

Figure 1:
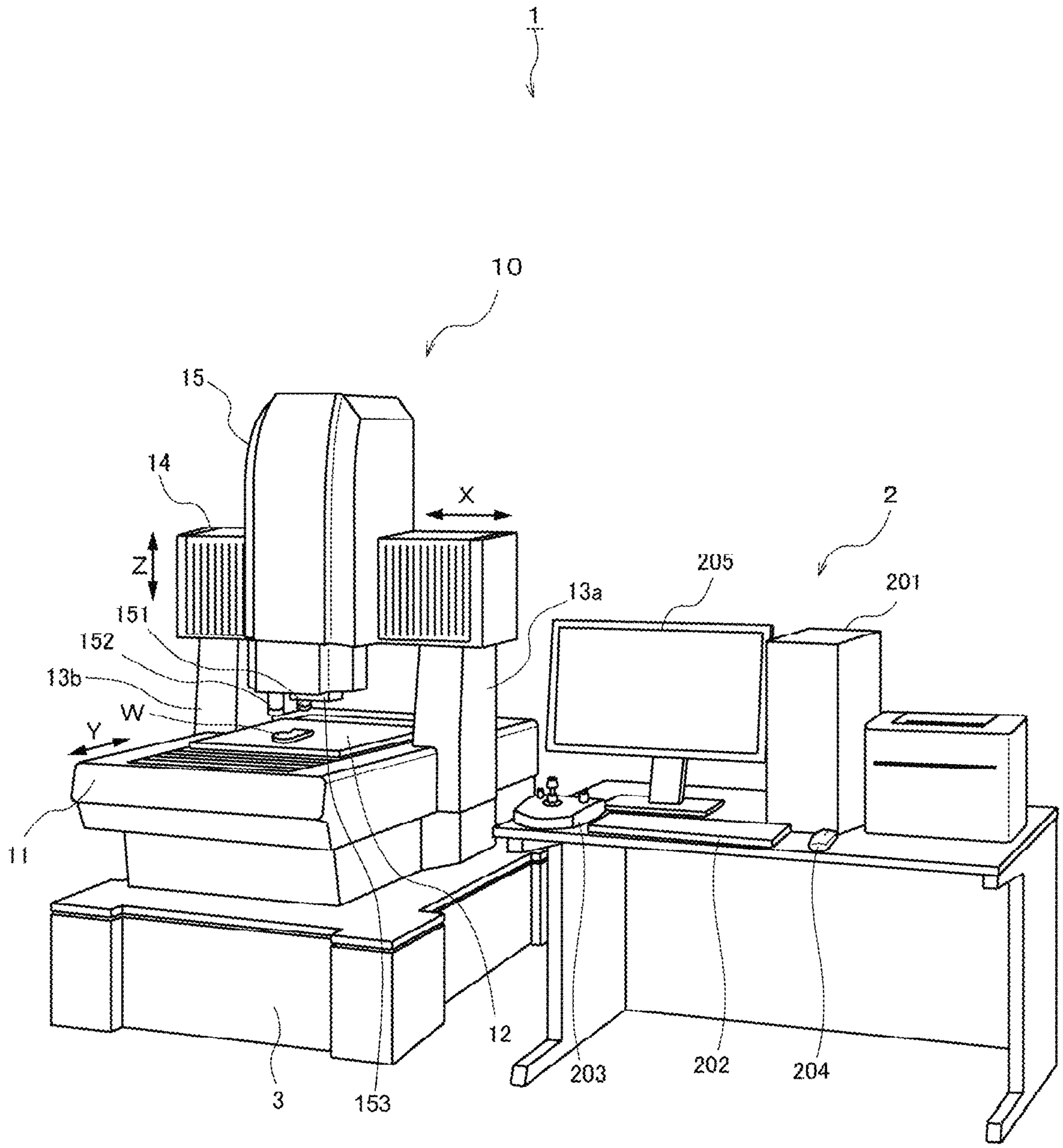
FIG. 1 is a perspective view showing the entire configuration of a surface shape measurement device 1.

FIG. 1 is a perspective view showing the entire configuration of the surface shape measurement device 1 according to the first embodiment. The surface shape measurement device 1 measures the surface shape of a measurement target surface of a measurement target (workpiece) W. The surface shape measurement device 1 includes a contactless image measurement machine 10 and a computer system 2 that drives and controls the image measurement machine 10 and performs the necessary data processing. In addition to the above, the surface shape measurement device 1 may include a printer, or the like, to print out the measurement results, or the like, as appropriate.

The image measurement machine 10 includes a cradle 11, a specimen table (stage) 12, support arms 13*a* and 13*b*, an X-axis guide 14, and an imaging unit 15. As shown in FIG. 1, the surface shape measurement device 1 is placed on a vibration removal table 3 installed on the floor. The vibration removal table 3 prevents the vibration of the floor from propagating to the surface shape measurement device 1 on the table. The vibration removal table 3 may be either active or passive. The cradle 11 is placed on the top panel of the vibration removal table 3, and on top of which, the stage 12 where the workpiece W is placed is placed so that the top surface as the base plane is aligned with the horizontal plane. In the following, the description is provided with the X and Y axes extending in the direction parallel to the base plane of the stage 12 and the Z axis extending in the direction perpendicular to the base plane. The stage 12 is driven in the Y-axis direction by a Y-axis drive mechanism not shown, and the workpiece W is movable in the Y-axis direction with respect to the imaging unit. The supporting arms 13*a* and 13*b* extending upwardly are fixed at the centers of the two sides of the cradle 11, and the X-axis guide 14 is fixed so that the upper ends of the supporting arms 13*a* and 13*b* are coupled. This X-axis guide 14 supports the imaging unit 15. The imaging unit 15 is driven along the X-axis guide 14 by an X-axis drive mechanism not shown.

The imaging unit 15 includes an image optical head 151 for imaging a two-dimensional image of the workpiece W and an interferometer optical head 152 for measuring the surface shape of the workpiece W by light interference measurement. Using either head, the workpiece W is measured at a measurement position set by the computer system 2. The measurement field of view of the image optical head 151 is usually set wider than the measurement field of view of the interferometer optical head 152, and both heads can be switched and used by control of the computer system 2. The image optical head 151 and the interferometer optical head 152 are supported by a common support plate so as to maintain a constant positional relationship, and are pre-calibrated so that the coordinate axes of the measurement do not change before and after the switching.

The image optical head 151 includes a CCD camera, an illumination device, a focusing mechanism, and other elements, and captures a two-dimensional image of the workpiece W. The data of the captured two-dimensional image is imported into the computer system 2.

Figure 2:
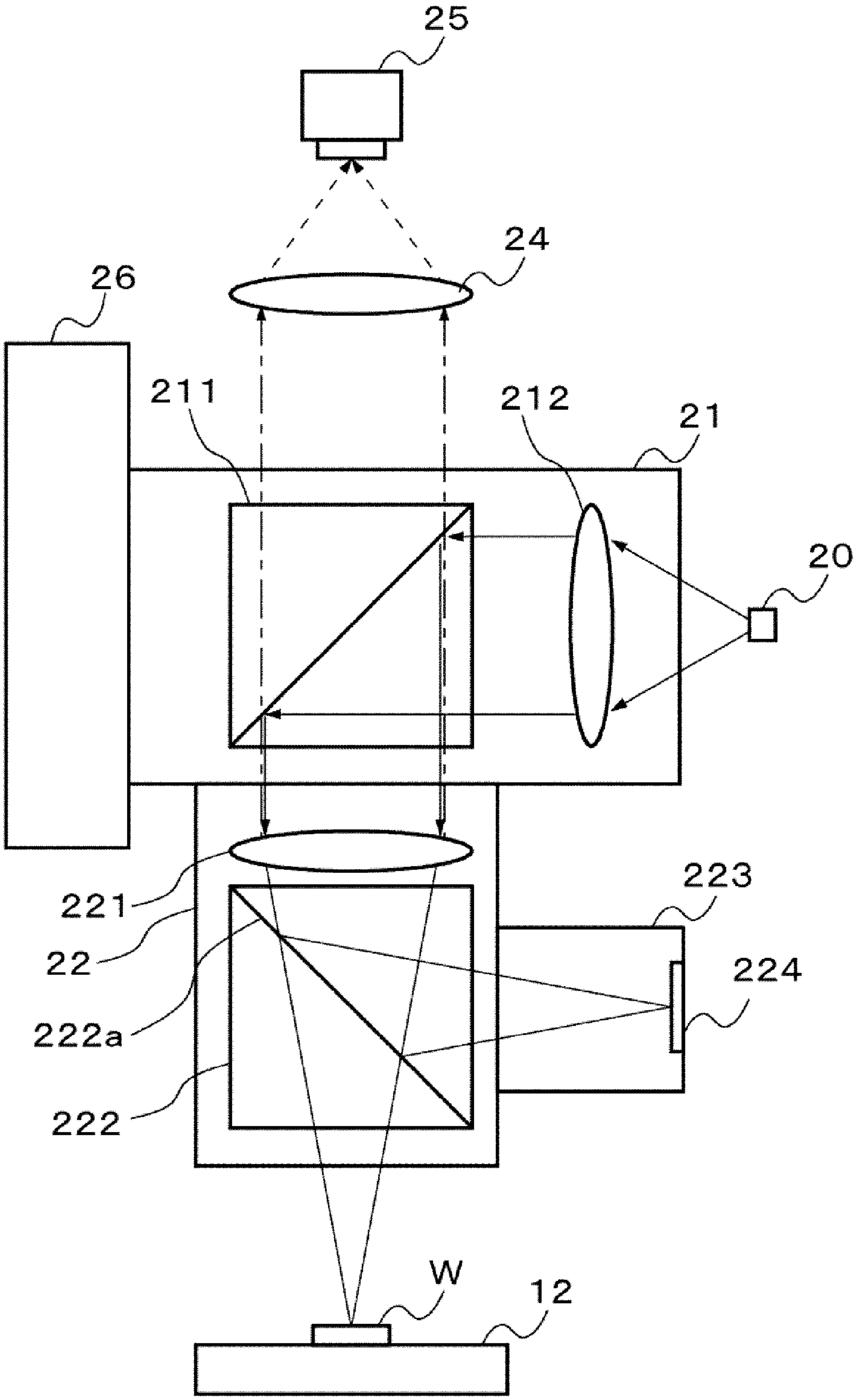
FIG. 2 is a schematic diagram showing a configuration of an interferometer optical head 152 along with the light paths.

FIG. 2 is a schematic diagram showing the configuration of the interferometer optical head 152 along with the light paths. As will be described below, the interferometer optical head 152 acquires, by an imaging element, an interference fringe image generated by the light path difference between light reflected from the measurement light path and light reflected from the reference light path. The interferometer optical head 152 constitutes a Michelson-type interferometer as shown in FIG. 2, and includes a light-emitting section 20, an illumination light guiding section 21, an objective lens section 22, an image-forming lens 24, an imaging section 25, and a driving mechanism section 26.

The light-emitting section 20 is a light source that applies light with low coherency (i.e., incoherent light). Here, the light with low coherency may be, for example, light with a coherence length of approximately 100 μm or less. The light-emitting section 20 outputs wide-band light with low coherency, having a large number of wavelength components over a wide band (e.g., wavelengths of 500 to 800 nm).

For example, a lamp light source (such as halogen), a light-emitting diode (LED), a super luminescent diode (SLD), and other light sources, are used for the light-emitting section 20. The light output from the light-emitting section 20 is preferably, for example, white light, but the light is not limited thereto, as long as the light is light with low coherency.

The illumination light guiding section 21 includes a beam splitter 211 and a collimator lens 212. The light emitted from the light-emitting section 20 is applied in a parallel manner to the beam splitter 211 via the collimator lens 212 from the direction perpendicular to the light axis of the objective lens section 22, and then, from the beam splitter 211, the light along the light axis is emitted and a parallel beam is applied from above to the objective lens section 22.

The objective lens section 22 is configured to include an objective lens 221, a beam splitter 222, a reference mirror section 223, and other elements. The reference mirror section 223 also includes a reference mirror 224 at a predetermined position. In the objective lens section 22, when the parallel beam enters the objective lens 221 from above, the entered light becomes convergent light at the objective lens 221 and enters a reflective surface 222*a* inside the beam splitter 222.

The entered light is branched off, at the beam splitter 222, into reflected light (reference light) that travels along the reference light path in the reference mirror section 223 and transmitted light (measurement light) that travels along the measurement light path in which the workpiece W is placed. The reflected light is reflected by the reference mirror 224, and then further reflected by the reflective surface 222*a* of the beam splitter 222. On the other hand, the transmitted light travels while converging, is reflected by the workpiece W, and transmits through the reflective surface 222*a* of the beam splitter 222. The reflected light from the reference mirror 224 and the reflected light from workpiece W are combined into a combined wave by the reflective surface 222*a* of the beam splitter 222.

The combined wave combined at the position of the reflective surface 222*a* of the beam splitter 222 becomes a parallel beam at the objective lens 221, travels upwards, passes through the illumination light guiding section 21, and enters the image forming lens 24 (the dashed-dotted line in FIG. 2). The image forming lens 24 converges the combined wave and forms an interference fringe image on the imaging section 25.

The imaging section 25 is, for example, a CCD camera consisting of two-dimensional imaging elements for constituting the imaging means, and it images an interference fringe image of the combined wave (the reflected light from the workpiece W and the reflected light from the reference mirror 224) output from the objective lens section 22. The interference fringe image captured by the imaging section 25 corresponds to the stacked image in the present invention.

Figure 3:
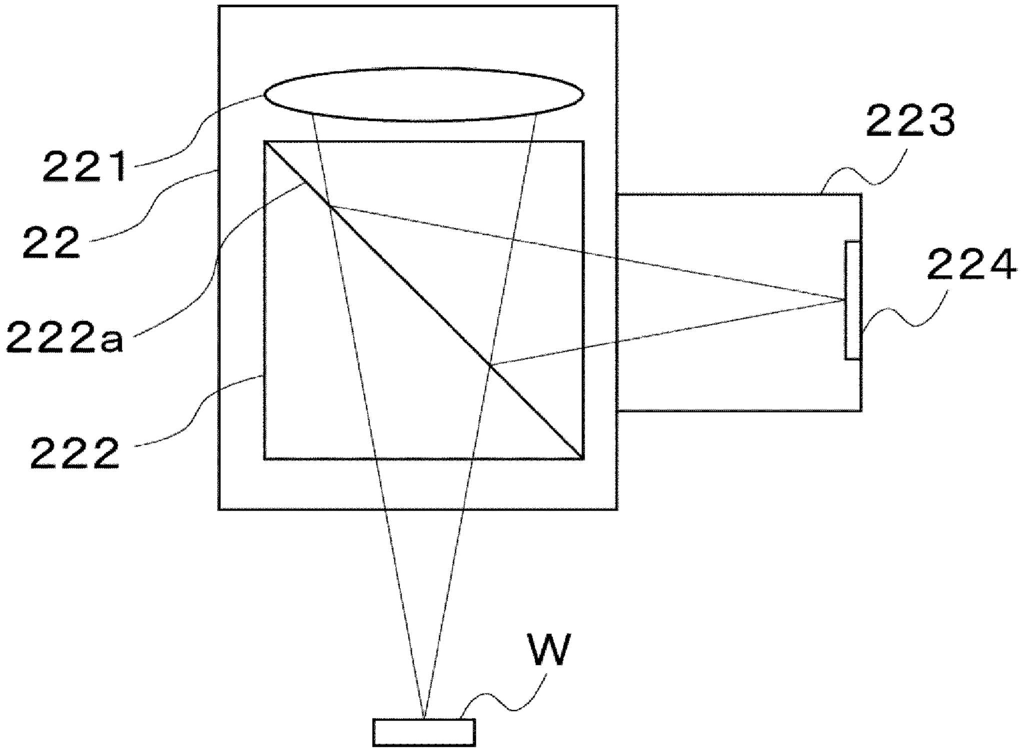
FIG. 3 is a main section enlarged view showing a structure of an objective lens section 22, and a measurement light path and a reference light path.

FIG. 3 is a main section enlarged view of the objective lens section 22. The driving mechanism section 26 corresponds to a light path length variable means of the present invention, and moves the interferometer optical head 152 in the light axis direction by a movement command from the computer system 2. FIG. 3 shows that a state in which the reference light path (dashed line) and the measurement light path (solid line) are equal in light path length. When performing the measurement, a large number of interference fringe images are acquired with different measurement light path lengths by capturing the interference fringe images while moving the interferometer optical head 152 in the light axis direction (i.e., in the Z-axis direction). Interference occurs when the difference between the length of the measurement light path and the length of the reference light path is approximately coherent length or less from the light source, and the interference intensity becomes the highest (i.e., the contrast of the interference fringes reaches the maximum) when the length of the measurement light path and the length of the reference light path coincide. It should be noted that, although the case of moving the interferometer optical head 152 is explained as an example above, it is also possible to have a configuration in which the length of the measurement light path is adjusted by moving the stage 12. In addition, it is also possible to have a configuration in which the length of the reference light path may be variable by moving the reference mirror 224 in the light axis direction (i.e., the right-left direction in FIG. 3). Thus, in the interferometer optical head 152, the light path length of either the reference light path or the measurement light path is variable.

The interferometer optical head 152 is moved and scanned along the positions in the light axis direction by the driving mechanism section 26 under the control of the computer system 2, and the imaging section 25 performs imaging every time it moves a predetermined distance. The interference fringe images are sequentially transferred to and imported into the computer system 2.

Referring back to FIG. 1, the computer system 2 includes a computer main body 201, a keyboard 202, a joystick box (hereinafter referred to as a J/S) 203, a mouse 204, and a display 205. The computer system 2 determines the surface shape of the measurement target surface based on the interference fringe images acquired by the interferometer optical head 152. The computer system 2 serves as an analysis unit in the present invention.

Figure 4:
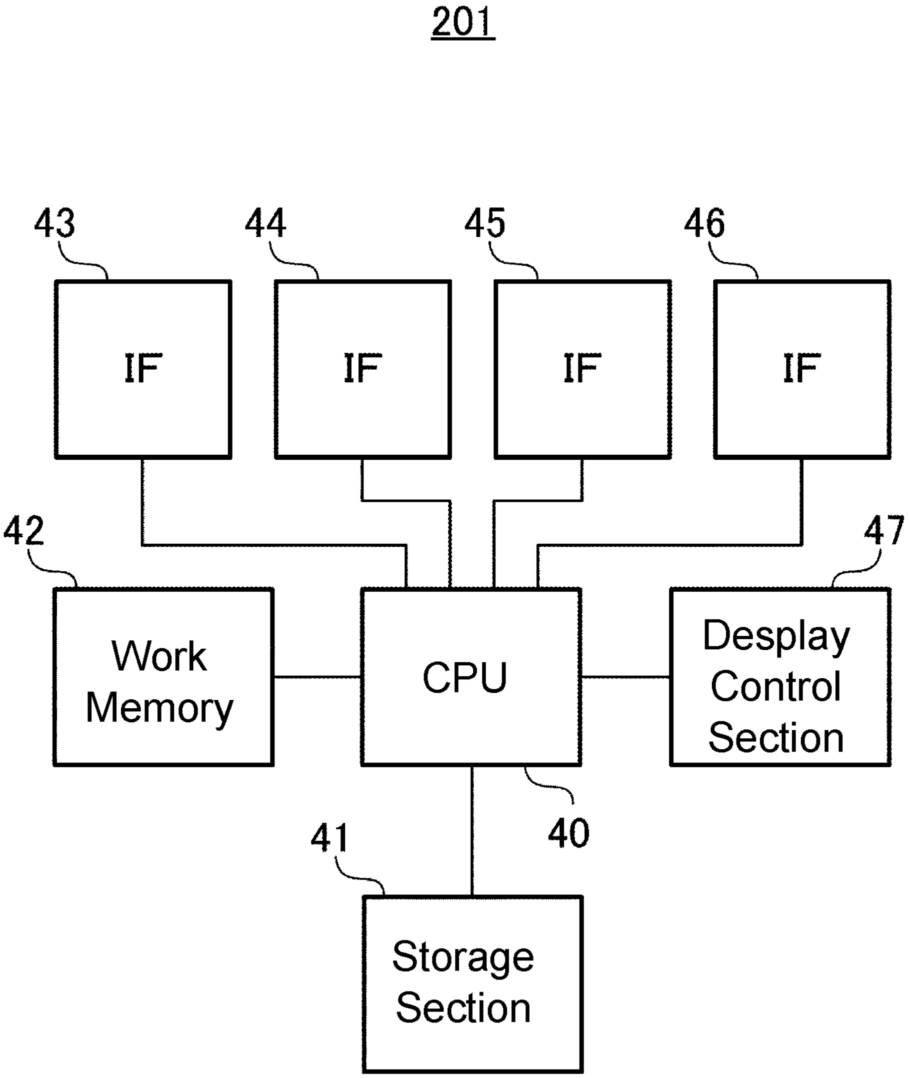
FIG. 4 is a block diagram showing a configuration of a computer main body 201.

FIG. 4 is a block diagram showing a configuration of the computer main body 201. As shown in FIG. 4, the computer main body 201 includes a CPU 40, which serves as the center of control, a storage section 41, a work memory 42, interfaces (denoted as "IF" in FIG. 4) 43, 44, 45, 46, and a display control section 47 that controls the display on the display 205.

Operator instruction information input from the keyboard 202, the J/S 203, or the mouse 204 is input to the CPU 40 via the interface 43. The interface 44 is connected to the image measurement machine 10, supplies various control signals from the CPU 40 to the image measurement machine 10, receives various status information, images, and the like, from the image measurement machine 10, and inputs them to the CPU 40.

When an image measurement mode is selected, the display control section 47 displays, on the display 205, an image formed by image signals supplied from the CCD camera in the image optical head 151. When a light interference measurement mode is selected, the display control section 47 displays, on the display 205, as needed, the image captured by the interferometer optical head 152, surface shape data measured by the interferometer optical head 152, and other data, based on the control by the CPU 40. The measurement results of the image optical head 151 and the interferometer optical head 152 can be output to the printer via the interface 45.

The work memory 42 provides a work area for various types of processing of the CPU 40. The storage section 41 is configured by, for example, a hard disk drive, a RAM, and the like, and stores programs to be executed by the CPU 40, the measurement results by the surface shape measurement device 1, and other data. The programs to be executed by the CPU 40 include a program that performs the analysis processing described below.

Based on various types of information input via the respective interfaces, the operator instructions, the programs stored in the storage section 41, and the like, the CPU 40 performs various types of processing including: switching between the image measurement mode using the image optical head 151 and the light interference measurement mode using the interferometer optical head 152; specifying the measurement range; moving the imaging unit 15 in the X-axis direction; moving the stage 12 in the Y-axis direction; imaging two-dimensional images by the image optical head 151; measuring interference fringe images by the interferometer optical head 152; and calculating the surface shape.

When calculating the surface shape, the CPU 40 identifies the moving scan position where the peak of the interference fringe occurs for each pixel position in the interference fringe image, and such moving scan position is considered as the height (i.e., the position in the Z-axis direction) of each pixel position in the interference fringe image.

Next, a method for determining the height at each pixel position in the interference fringe image using the surface shape measurement device 1 of the present embodiment will be described. In the following, N (where N≥2) interference fringe images will be acquired while scanning the interferometer optical head 152 in the Z-axis direction along the light axis from a start point (e.g., the position closest to the workpiece W in the scan range in the Z-axis direction) to an end point (e.g., the position farthest from the workpiece W in the scan range in the Z-axis direction). Then, the height (i.e., the position in the Z-axis direction) at each pixel position is determined based on the N interference fringe images acquired in this manner. The surface shape of the workpiece W can be grasped from the determined height of each pixel position.

In the present embodiment, for a common pixel position in the N interference fringe images, a signal indicating the change in the interference light intensity at each imaged position (i.e., the luminance value of the pixel) along the Z-axis direction is considered as the interference signal (FIG. 5A), the square values of this interference signal or the absolute values of the interference signal is determined, and the height (i.e., the position in the Z-axis direction) at each pixel position is determined from the integral curve (FIG. 5B) obtained by integrating the square values or the absolute values. The square or absolute value of the interference signal corresponds to the height-dependent signal in the present invention.

Figure 6:
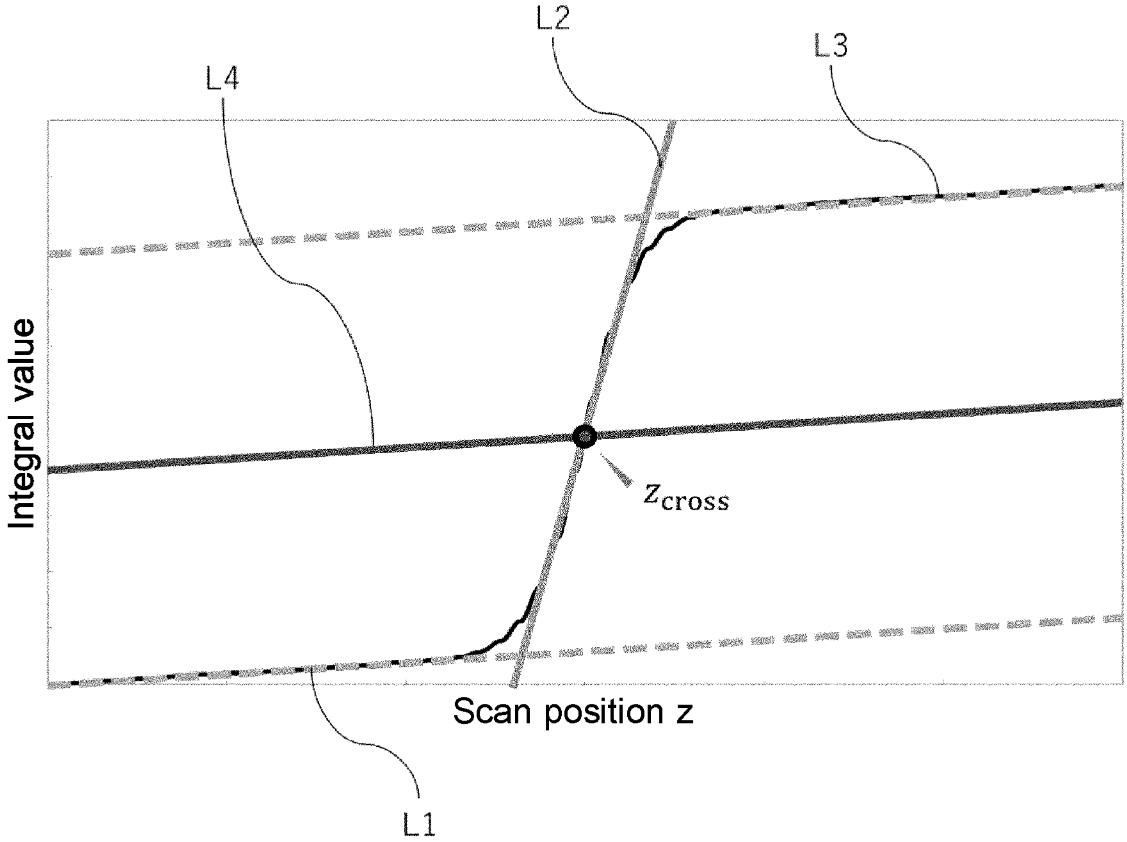
FIG. 6 is a diagram showing three straight lines (L1 to L3) that approximate the integral curve, an intermediate straight line L4 calculated from these straight lines, and the position $Z_{cross}$ at the measurement target surface.

In the method of the present embodiment, such integral curve is approximated by three straight lines consisting of a start-point-side noise part straight line L1, an interference part straight line L2, and an end-point-side noise part straight line L3, as shown in FIG. 6. The start-point-side noise part straight line L1 approximates a start-point-side noise part, which corresponds to the range without the occurrence of interference closer to the start point than to the measurement target surface. In addition, the end-point-side noise part straight line L3 approximates an end-point-side noise part, which corresponds to the range without the occurrence of interference closer to the end point than to the measurement target surface. Moreover, the interference part straight line L2 approximates the interference part, which corresponds to the range with the occurrence of interference in the vicinity of the measurement target surface. The interference part corresponds to the surface proximity part of the present invention, and the interference part straight line corresponds to the surface proximity straight line of the present invention. The start-point-side noise part and end-point-side noise part are the range where the slope of the integral curve is smaller than that of the surface proximity part near the measurement target surface.

The start-point-side noise part straight line L1 may be determined based on a predetermined number of points (e.g., ten points) from the start point of the integral curve. The end-point-side noise part straight line L3 may be determined based on a predetermined number of points (e.g., ten points) from the end point of the integral curve. In addition, the start-point-side noise part straight line L1 and the end-point-side noise part straight line L3 may be determined under the restriction that the slopes of the start-point-side noise part straight line L1 and the end-point-side noise part straight line L3 are equal.

The interference part straight line L2 may be a straight line with the maximum slope out of approximate straight lines for a predetermined number of consecutive points in the integral curve. For example, the approximate straight lines may be determined by applying the least squares method to all of the predetermined number of consecutive points. Alternatively, the straight line connecting the points at the ends of the predetermined number of consecutive points may be set as the approximate straight line.

Then, the position (height) in the Z-axis direction of the measurement target surface is determined based on the start-point-side noise part straight line L1, the end-point-side noise part straight line L3, and the interference part straight line L2. Specifically, an intermediate straight line L4 is determined, the intermediate straight ling L4 having a slope obtained by averaging the slope of the start-point-side noise part straight line L1 and the slope of the end-point-side noise part straight line L3, and having an intercept obtained by averaging the intercept of the start-point-side noise part straight line and the intercept of the end-point-side noise part straight line. Then, the intersection point $Z_{cross}$ between the intermediate straight line L4 and the interference part straight line L2 is determined, and the position of this intersection point is defined as the position (height) in the Z-axis direction of the measurement target surface.

The surface shape of the workpiece W may be obtained by applying the above-described method to all pixels in the interference fringe image and obtaining the positions in the Z-axis direction $Z_{cross}$.

Figure 7:
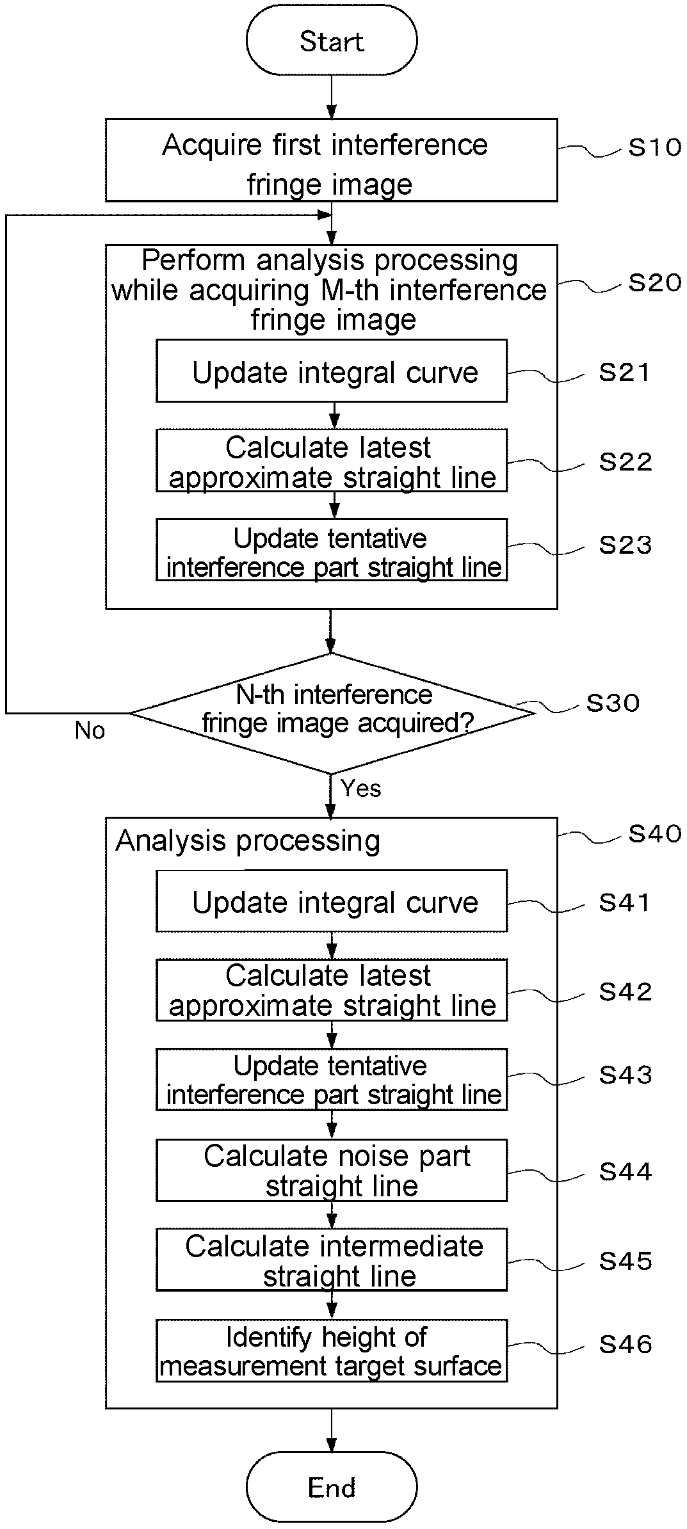
FIG. 7 is a flowchart showing an example of the procedures of the surface shape measurement of the present embodiment.

The position in the Z-axis position of the measurement target surface is determined from the integral curve by the above-described method, but the analysis processing for determining the height at the pixel position may be started before all N points constituting the integral curve are obtained (i.e., before the N interference fringe images are imaged). In the following, with reference to the flowchart shown in FIG. 7, a method will be described for performing at least part of the analysis processing, before all N interference fringe images are obtained, by using interference fringe images that are already stored in the computer system 2 while imaging interference fringe images by the interferometer optical head 152 and importing them into the computer system 2. With this method, a reduction in the processing time and the processing load can be achieved.

As described above, in the surface shape measurement device 1, N (where N≥2) interference fringe images are sequentially imaged while scanning from the start point to the end point in the Z-axis direction along the light axis of the interferometer optical head 152, and the images are transferred to the computer system 2. In the present method, when the measurement starts, the surface shape measurement device 1 first acquires the first interference fringe image (step S10). Then, the M-th interference fringe image (where 2≤M≤N) is sequentially acquired while the position of the interferometer optical head 152 is scanned, and, in parallel thereto, the computer system 2 implements analysis processing on the interference fringe images up to the M−1-th image (step S20).

The analysis processing for the interference fringe images up to the M−1-th image includes integral curve update processing (step S21) for determining the values of the points from the start point to the M−1-th point constituting the integral curve for each position in the lastly acquired M−1-th interference fringe image. This integral curve update processing is processing in which, for each position in the M−1-th interference fringe image, the value of the M−1-th point in the integral curve is determined by adding the square value of the luminance value to the integral value up to the M−2-th image. The initial value of the integral value (i.e., the integral value up to the M−2=0-th image, to which the square value of the luminance value is added, when M=2) is 0.

In addition, the analysis processing for the interference fringe images up to the M−1-th image includes latest approximate straight line calculation processing (step S22) for determining the approximate straight line for a predetermined number of consecutive points including the M−1-th point of the integral curve as the point closest to the end point. If M−1 fails to satisfy the predetermined number, the latest approximate straight line calculation processing may not need to be carried out.

In addition, the analysis processing for the interference fringe images up to the M−1-th image includes tentative interference part straight line update processing (step S23) for determining the tentative interference part straight line with the maximum slope out of approximate straight lines for the predetermined number of consecutive points up to the M−1-th point in the integral curve. In this tentative interference part straight line update processing, the tentative interference part straight line determined for the points up to the M−2-th point in the integral curve is compared with the approximate straight line determined in the latest approximate straight line calculation processing, and the one with the greater slope is determined as the new tentative interference part straight line. If M−1 fails to satisfy the predetermined number, the tentative interference part straight line update processing may not need to be carried out.

In this way, part of the processing for determining the height of the measurement target surface can be proceeded before acquiring all of the N interference fringe images by proceeding with the analysis processing of the already-acquired interference fringe images up to the M−1-th image while acquiring the M-th interference fringe image.

After step S20, if the N-th interference fringe image has not yet been acquired (step S30; No), the flowchart goes back to step S20 and the analysis processing is performed on the already-acquired interference fringe images while acquiring the next interference fringe image.

After repeating step S20 until the N-th interference fringe image is acquired (step S30; Yes), the analysis processing (step S40) is performed on the first interference fringe image through the N-th interference fringe image. The analysis processing performed on the first interference fringe image through the N-th interference fringe image includes: the integral curve update processing (step S41) for determining the value of the N-th point in the integral curve; the latest approximate straight line calculation processing (step S42); and the tentative interference part straight line update processing (step S43). The tentative interference part straight line obtained in the tentative interference part straight line update processing in the analysis processing performed on the first interference fringe image through the N-th interference fringe image is determined as the interference part straight line.

In this way, when the N-th interference fringe image is acquired, the integral curve up to the already-acquired N−1-th point and the tentative interference part straight line based on the integral curve up to the N−1-th point can already be determined. Then, after acquiring the N-th interference fringe image, the entire integral curve can be established only by determining the N-th point (i.e., the last point) in the integral curve. In addition, the final interference part straight line can be obtained only by determining the approximate straight line including the N-th point, comparing it with the tentative interference part straight line based on the integral curve up to the N−1-th point, and making a selection.

In addition, in the analysis processing after acquiring the N-th interference fringe image, the start-point-side noise part straight line L1 and the end-point-side noise part straight line L3 are determined (step S44) based on a predetermined number of points from the start point in the integral curve and a predetermined number of points from the end point in the integral curve.

If there is no restriction to the effect that the slopes of the start-point-side noise part straight line L1 and the end-point-side noise part straight line L3 are equal, when M−1 matches the number of points necessary to determine the start-point-side noise part straight line L1, the start-point-side noise part straight line L1 may be determined in the analysis processing for the interference fringe images up to the M−1-th image and the end-point-side noise part straight line L3 may be determined in the analysis processing after the N-th interference fringe image has been acquired.

In the analysis processing after the N-th interference fringe image has been acquired, the intermediate straight line is subsequently determined from the start-point-side noise part straight line L1 and the end-point-side noise part straight line L3 (step S45). Further, the intersection point between the intermediate straight line and the interference part straight line is determined, and the position $Z_{cross}$ of this intersection point is defined as the position (height) in the Z-axis direction of the measurement target surface (step S46).

In this way, after the interference part straight line has been determined, the height of the measurement target surface can be determined by processing with relatively low processing load and that does not require a large amount of work memory, such as straight-line approximation with relatively few points and calculation of the intersection point of the straight lines.

As described above, the surface shape measurement device 1 according to the present embodiment can suppress the work memory and computational power necessary for analysis processing. In addition, the measurement time can be reduced by performing the capturing and the analysis processing of the interference fringe images in parallel.

Second Embodiment

The surface shape measurement device 1B of the second embodiment differs from the surface shape measurement device 1 of the first embodiment in that it performs so-called PFF (Point From Focus) measurement. PFF measurement uses a plurality of stacked images of the measurement target surface of the workpiece while scanning the measuring head in the optical axis direction to obtain a focal point (height) from the change in contrast at each pixel position in the stacked images as the height of the measurement target surface. The following is a description of the surface shape measurement device 1B, focusing on the points where it differs from the surface shape measurement device 1 of the first embodiment. It should be understood that the configuration not specifically described is the same as that of the surface shape measurement device 1 of the first embodiment.

The surface shape measurement device 1B, like the surface shape measurement device 1 of the first embodiment, includes a contactless image measurement machine 10 and a computer system 2 that drives and controls the image measurement machine 10 and performs the necessary data processing. The image measurement machine 10 includes a cradle 11, a specimen table (stage) 12, support arms 13*a* and 13*b*, an X-axis guide 14, and an imaging unit 15, like those shown in FIG. 1 with respect to the first embodiment.

The imaging unit 15 in the second embodiment includes an image optical head 151 that captures a two-dimensional image of the workpiece W at a measurement position set by the computer system 2. The image optical head 151 includes a CCD camera, an illumination device, a focusing mechanism, and other elements, and captures a two-dimensional image of the workpiece W. The data of the captured two-dimensional image is imported into the computer system 2.

When measuring surface shape by PFF measurement, a plurality of stacked images are captured while scanning the measuring head in the optical axis direction (Z-axis direction) with the focal distance by the focusing mechanism fixed at a predetermined distance.

When calculating the height of the measurement target surface on the workpiece from the captured stack images, the CPU 40 of computer system 2 determines for each pixel position in the stack images a contrast curve that indicates the degree of local focus according to the height (scanning position of the measuring head) at the time of image capture. Then, the CPU 40 identifies the scanning position where the peak in this contrast curve occurs, and this position is taken as the height (position in the Z-axis direction) at each pixel position in the stacked images.

In the surface shape measurement device 1 of the first embodiment, for each pixel position in the interference images, the square or absolute value of the interference signal, which indicates the intensity of interference depending on the height (scanning position of the measuring head) at the time of imaging, was used as the height-dependent signal. The height of the measurement target surface was then obtained by analyzing the integral curve obtained by integrating the height-dependent signal.

In contrast, the surface shape measurement device 1B of the second embodiment uses the contrast curve as the height-dependent signal. In other words, the height of the measurement target surface can be obtained by applying the same analysis method as in the first embodiment to the integral curve obtained by integrating the contrast curve.

Third Embodiment

The surface shape measurement device 1C according to the third embodiment differs from the surface shape measurement devices 1 and 1B of the first and second embodiments above in that it performs measurements using the so-called structured illumination microscopy (SIM) method.

In measurement using the SIM method, a projection light of a pattern having periodicity in the direction perpendicular to the optical axis is irradiated onto the workpiece, and while scanning the measuring head in the optical axis direction the measurement target surface on the workpiece is imaged, and the projection light reflected on the measurement target surface on the workpiece is imaged to obtain a plurality of stack images. Then, using the obtained stacked images, the position (height) where the pattern comes into focus is determined based on the change in contrast of the pattern at each pixel position in the stacked images, and this position is determined as the height of the measurement target surface. The following is a description of the surface shape measurement device 1C, focusing on the points where it differs from the surface shape measurement device 1 of the first embodiment and the surface shape measurement device 1B of the second embodiment. It should be understood that the configuration not specifically described is the same as that of the surface shape measurement device 1 of the first embodiment or the surface shape measurement device 1B of the second embodiment.

The surface shape measurement device 1C, like the surface shape measurement device 1 of the first embodiment or the surface shape measurement device 1B of the second embodiment, includes a contactless image measurement machine 10 and a computer system 2 that drives and controls the image measurement machine 10 and performs the necessary data processing. The image measurement machine 10 includes a cradle 11, a specimen table (stage) 12, support arms 13*a* and 13*b*, an X-axis guide 14, and an imaging unit 15, like those shown in FIG. 1 with respect to the first embodiment.

The imaging unit 15 in the third embodiment includes an image optical head 151 that captures a two-dimensional image of the workpiece W at a measurement position set by the computer system 3. The image optical head 151 includes a CCD camera, an illumination device, a focusing mechanism, and other elements, and captures a two-dimensional image of the workpiece W. The data of the captured two-dimensional image is imported into the computer system 2.

In addition to the above, the imaging unit 15 in the third embodiment is equipped with a pattern projection unit 153 that irradiates a projection light of a pattern having a predetermined periodicity onto the measurement target surface of the workpiece. The pattern projection unit 153 is, for example, a projector. The pattern projection unit 153 is equipped with an illumination light source and focusing mechanism, which are independent of the illumination system and focusing mechanism of the image optical head 151. In other words, when the image optical head is scanned in the optical axis direction, the pattern projection unit 153 does not move in conjunction with the scanning.

When measuring the surface shape by the SIM method, a predetermined pattern is projected by the pattern projection unit 153 so that it is focused on the measurement target surface on the workpiece. Then, as in the PFF measurement in the second embodiment, a plurality of stacked images are captured while scanning the measuring head in the optical axis direction (Z-axis direction) with the focal distance by the focusing mechanism of the image optical head 151 fixed at a predetermined distance.

When calculating the height of the measurement target surface on the workpiece from the captured stack images, the CPU 40 of computer system 2 determines for each pixel position in the stack images a change in the intensity of the reflected light according to the height (scanning position of the measuring head) at the time of image capture. Then, the CPU 40 identifies the scanning position where the peak in this change in the intensity of the reflected light occurs, and this position is taken as the height (position in the Z-axis direction) at each pixel position in the stacked images.

Figure 5A:
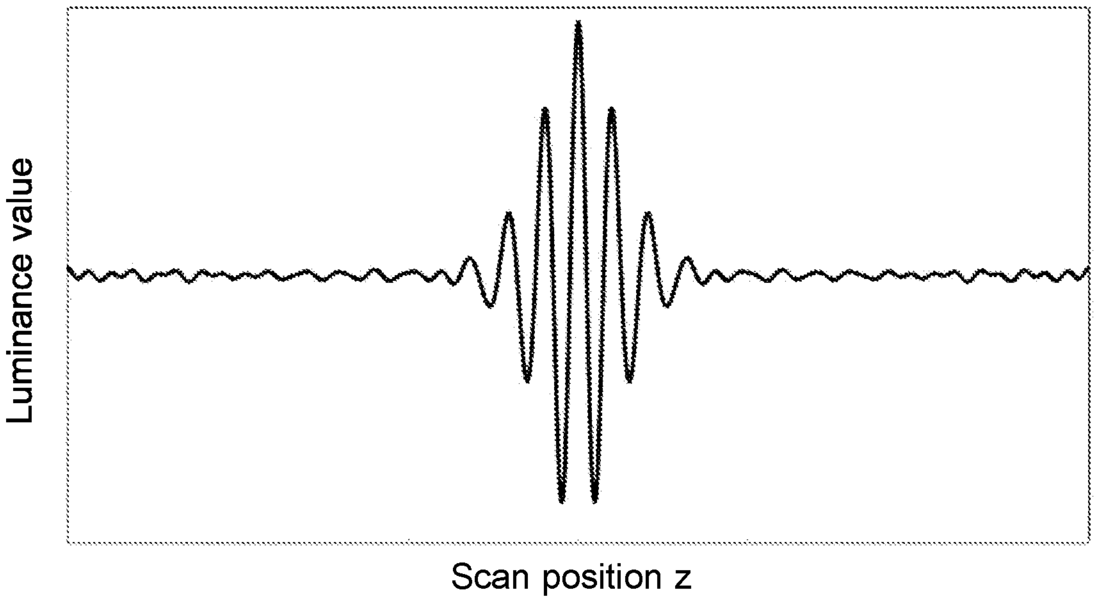
FIG. 5A shows an example of an interference signal.
Figure 5B:
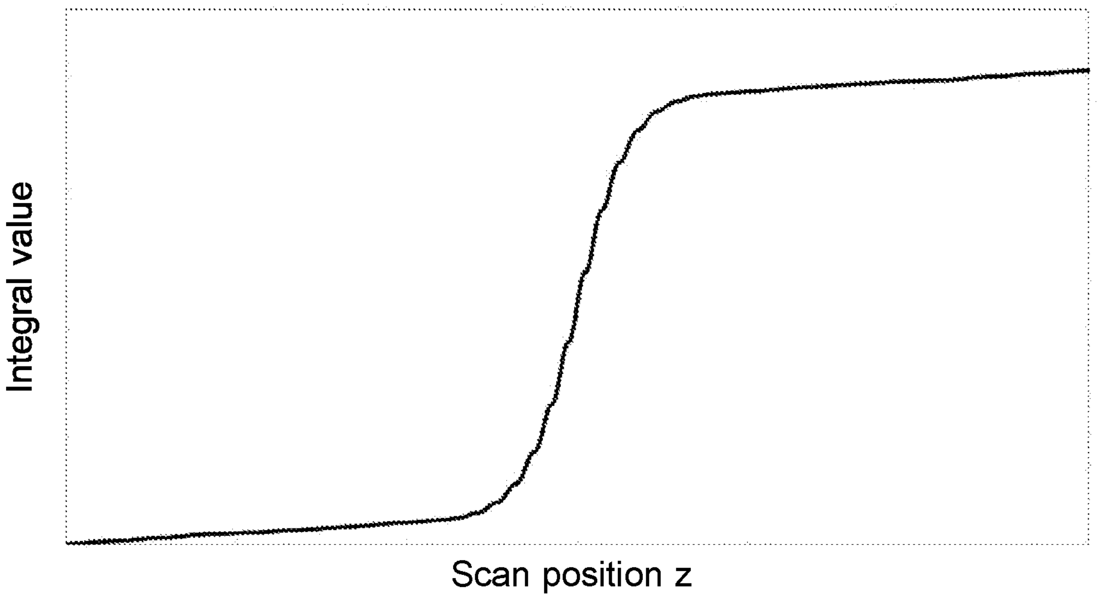
FIG. 5B shows an example of an integral curve w based on the interference signal.

The change in the intensity of the reflected light of the projection light reflected from the measurement target surface of the workpiece is a curve similar to the interference signal of the first embodiment shown in FIG. 5A, and is constant at a position far enough from the focal position, but increases or decreases in the vicinity of the focal position, with the amplitude being maximum at the focal position. Since this change in reflected light intensity is similar to the change in interference signal in the first embodiment, the height of the measurement target surface is determined using the same method as the surface profilometer measuring apparatus 1 in the first embodiment. In the first embodiment, for each pixel position in the interference images, the square or absolute value of the interference signal, which indicates the intensity of interference depending on the height (scanning position of the measuring head) at the time of imaging, was used as the height-dependent signal. The height of the measurement target surface was then obtained by analyzing the integral curve obtained by integrating the height-dependent signal.

Similar to this, the third embodiment of the surface shape measurement device 1C uses the square or absolute value of the change in intensity of the reflected light as a height-dependent signal. In other words, the height of the measurement target surface can be obtained by applying the same analysis method as in the first embodiment to the integral curve obtained by integrating the square or absolute value of the change in intensity of the reflected light.

According to each of the embodiments described above, it is possible to realize a measurement method of a surface shape and a surface shape measurement device that can suppress the work memory and computational power necessary for analysis processing, and thereby reduce the measurement time.

Modification of Embodiment

It should be noted that the present invention is not limited to the above-described embodiments, and any variation, improvement, and the like, are included in the present invention to the extent that the object of the present invention can be achieved.

For example, in the above-described first embodiment, an image measurement device using a Michelson-type interferometer was described as an example, but the present invention can be applied to various measurement devices, microscopes, and/or the like, using an interferometer, other than the image measurement device. The present invention can also be applied to measurement devices using an equal-light path interferometer, such as a Millau-type, a Fiseau-type, a Twyman-Green-type, or another type.

In the above-described embodiments, the analysis processing was performed by the computer system 2, but some or all of the analysis processing may be realized by dedicated hardware using ASICs and/or FPGAs.

It should be noted that embodiments obtained by those skilled in the art appropriately performing addition, deletion and/or design change of components on the above-described respective embodiments and embodiments obtained by those skilled in the art appropriately combining the features of the respective embodiments, are also encompassed in the scope of the present invention, provided that they include the gist of the present invention.

INDUSTRIAL APPLICABILITY

By applying the present invention to a surface shape measurement device, the work memory and computational power required for analysis processing can be suppressed, which in turn reduces the measurement time.

The invention claimed is:

1. A measurement method for measuring a surface shape, comprising:

capturing stacked images of a measurement target while scanning a measuring head in an optical axis direction; and measuring the surface shape of the measurement target by combining N stacked images captured while scanning the measuring head in the optical axis direction, wherein, for a common position in the N stacked images:

determining, from an integral curve consisting of values of N points, which is obtained by integrating a height-dependent signal consisting of values at N points indicating changes in a pixel value along a Z-axis direction of the measurement target surface: a start-point-side noise part straight line that approximates a start-point-side noise part, which corresponds to a range where a slope is smaller than a slope in the vicinity of a measurement target surface at a start-point-side than the measurement target surface, an end-point-side noise part straight line that approximates an end-point-side noise part, which corresponds to a range where the slope is smaller than the slope in the vicinity of the measurement target surface at the end-point-side than the measurement target surface, and a surface proximity straight line that approximates a surface proximity part, which corresponds to the vicinity of the measurement target surface; and determining the position in the Z-axis direction of the measurement target surface based on the start-point-side noise part straight line, the end-point-side noise part straight line, and the surface proximity straight line, and wherein the measuring of the surface shape is updated as the stacked images of the measurement target are sequentially captured, and the integral curve is repeatedly updated based on the sequentially captured stacked images.

2. The measurement method for measuring the surface shape according to claim 1, wherein:

the measuring head is an interferometer optical head that divides, by a beam splitter, light applied from a light source that applies incoherent light into reference light to a reference mirror and measurement light to the measurement target surface, and acquires interference fringe images generated by a light path difference between light reflected from the reference mirror and light reflected from the measurement target surface;

the stacked images are N (but $N \geq 2$) interference fringe images obtained while scanning the interferometer optical head against the measurement target surface from the start point to the end point in the Z-axis direction along the optical axis of the interferometer optical head; and the height-dependent signal is the square or absolute value of the interference signal consisting of values at N points indicating changes in the interference light intensity along the Z-axis direction.

3. The measurement method for measuring the surface shape according to claim 1, wherein:

the measuring head is an image optical head that captures a two-dimensional image of the measurement target;

the stacked images are N (but N≥2) two-dimensional images obtained while scanning the image optical head against the measurement target surface from the start point to the end point in the Z-axis direction along the optical axis of the image optical head; and the height-dependent signal is a contrast curve consisting of values at N points indicating changes in the contrast along the Z-axis direction.

4. The measurement method for measuring the surface shape according to claim 1, further comprising:

projecting a projection light, from a pattern projector, of a pattern having a predetermined periodicity onto the measurement target surface; wherein the measuring head is an image optical head that captures a two-dimensional image of the measurement target; the stacked images are N (but N≥2) two-dimensional images obtained while scanning the image optical head against the measurement target surface from the start point to the end point in the Z-axis direction along the optical axis of the image optical head, with the pattern projection unit irradiating the measurement target surface with the projection light; and the height-dependent signal is the square or absolute value of the value of the N points that indicates the change along the Z-axis direction of the intensity of the reflected light, which is the projection light reflected by the measurement target surface.

5. The measurement method for measuring the surface shape according to claim 1, wherein the surface proximity straight line is a straight line with the maximum slope out of approximate straight lines for a predetermined number of consecutive points in the integral curve.

6. The measurement method for measuring the surface shape according to claim 5, wherein the approximate straight lines are determined by applying the least squares method to all of the predetermined number of points.

7. The measurement method for measuring the surface shape according to claim 5, wherein the straight line connecting the points at the ends of the predetermined number of consecutive points is set as the approximate straight line.

8. The measurement method for measuring the surface shape according to claim 1, wherein the start point-side noise part straight line and the end-point-side noise part straight line are determined under the restriction that the slopes of the start-point-side noise part straight line and the end-point-side noise part straight line are equal.

9. The measurement method for measuring the surface shape according to claim 1, wherein the start-point-side noise part straight line is determined based on a predetermined number of points from the start point in the integral curve, and the end-point-side noise part straight line is determined based on a predetermined number of points from the end point in the integral curve.

10. The measurement method for measuring the surface shape according to claim 1, wherein the intersection of an intermediate straight line and the surface proximity straight line is the position in the Z axis direction of the measurement target surface, where the intermediate straight line is a line having a slope obtained by averaging the slope of the start-point-side noise part straight line and the slope of the end-point-side noise part straight line, and having an intercept obtained by averaging the intercept of the start-point-side noise part straight line and the intercept of the end-point-side noise part straight line.

11. The measurement method for measuring the surface shape according to claim 1, wherein, after acquiring the first stacked image, performing analysis processing on the stacked images up to the M−1-th image while sequentially acquiring the M-th (where 2≤M≤N) stacked image, and after acquiring the N-th stacked image, performing the analysis processing on the first stacked image through the N-th stacked image, and wherein the analysis processing includes, for an each position in the lastly acquired k-th stacked image, at least:

the integral curve update processing for determining the values of the points from the start point to the k-th point constituting the integral curve;

latest approximate straight line calculation processing for determining the approximate straight line for a predetermined number of consecutive points including the k-th point of the integral curve as the point closest to the end point; and tentative surface proximity straight line update processing for determining the tentative surface proximity straight line with the maximum slope out of approximate straight lines for the predetermined number of consecutive points up to the k-th point in the integral curve, where the tentative surface proximity straight line determined for the points up to the k−1-th point in the integral curve is compared with the approximate straight line determined in the latest approximate straight line calculation processing, and the one with the greater slope is determined as the new tentative surface proximity straight line, and wherein the tentative surface proximity straight line obtained by the tentative surface proximity straight line update processing in the analysis process after the N-th stacked image is acquired is determined as the surface proximity straight line.

* * * * *